(12) United States Patent
Kurosawa et al.

(10) Patent No.: US 12,283,189 B2
(45) Date of Patent: Apr. 22, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Kengo Kurosawa, Chofu (JP); Akira Ito, Ichikawa (JP); Takaaki Miyazaki, Yokohama (JP); Yasunobu Yokoi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 17/967,289

(22) Filed: Oct. 17, 2022

(65) Prior Publication Data

US 2023/0140719 A1    May 4, 2023

(30) Foreign Application Priority Data

Oct. 29, 2021 (JP) .................. 2021-177954

(51) Int. Cl.
*G08G 1/16* (2006.01)

(52) U.S. Cl.
CPC .............. *G08G 1/161* (2013.01); *G08G 1/166* (2013.01)

(58) Field of Classification Search
CPC ........ G08G 1/161; G08G 1/166; G08G 1/164; G08G 1/005; H04W 4/40; H04W 4/025; H04W 4/027; G08B 21/02
See application file for complete search history.

(56) References Cited

U.S. PATENT DOCUMENTS

| | | | |
|---|---|---|---|
| 6,472,978 B1* | 10/2002 | Takagi | G08G 1/005 340/904 |
| 9,897,453 B2* | 2/2018 | Yamashiro | H04W 4/023 |
| 11,970,165 B2* | 4/2024 | Sim | B60W 30/09 |
| 11,993,268 B2* | 5/2024 | Tokunaga | B60W 50/082 |
| 2016/0148505 A1* | 5/2016 | Mizuguchi | G08G 1/163 701/41 |
| 2020/0143237 A1* | 5/2020 | Gordon | G06N 3/08 |
| 2021/0380104 A1* | 12/2021 | Sim | H04W 4/021 |
| 2022/0009504 A1* | 1/2022 | Tokunaga | B60W 40/08 |
| 2022/0160573 A1* | 5/2022 | Taniguchi | A61H 3/061 |

FOREIGN PATENT DOCUMENTS

| | | |
|---|---|---|
| JP | 2002-310680 A | 10/2002 |
| JP | 2010-272125 A | 12/2010 |
| JP | 2016-146170 A | 8/2016 |
| JP | 2020-098530 A | 6/2020 |

* cited by examiner

*Primary Examiner* — Sisay Yacob
(74) *Attorney, Agent, or Firm* — Dinsmore & Shohl LLP

(57) ABSTRACT

An information processing device includes: a first acquisition unit configured to acquire position information of a mobile terminal; a second acquisition unit configured to acquire position information of a vehicle; a third acquisition unit configured to acquire movement means information of a holder of the mobile terminal; a determination unit configured to determine a likelihood of collision between the holder of the mobile terminal and the vehicle at a crossing based on a position of at least one crossing included in road information stored in a storage unit; and a notification unit configured to give a warning to at least one of the mobile terminal and a person in the vehicle based on a result of determination from the determination unit.

10 Claims, 11 Drawing Sheets

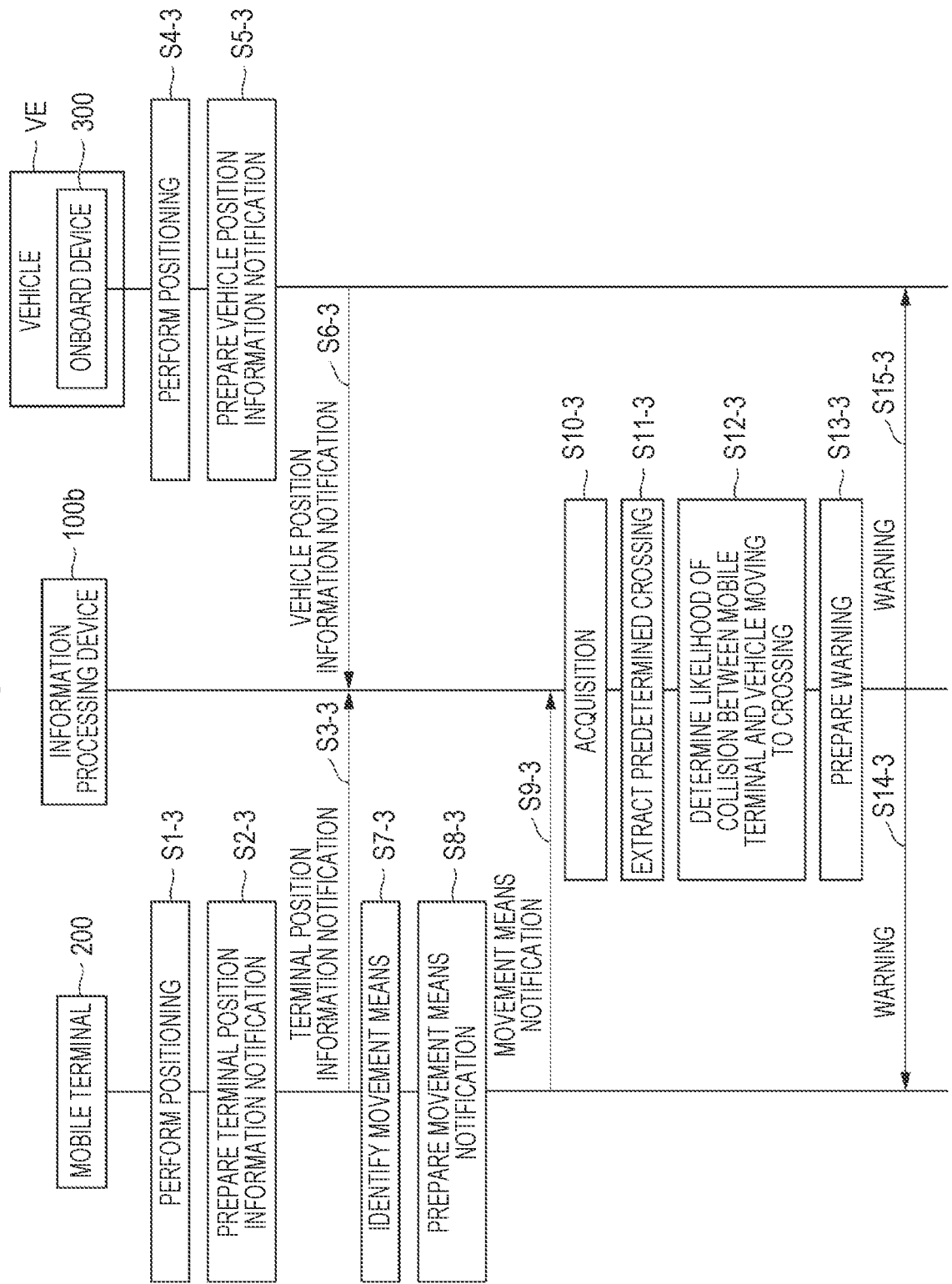

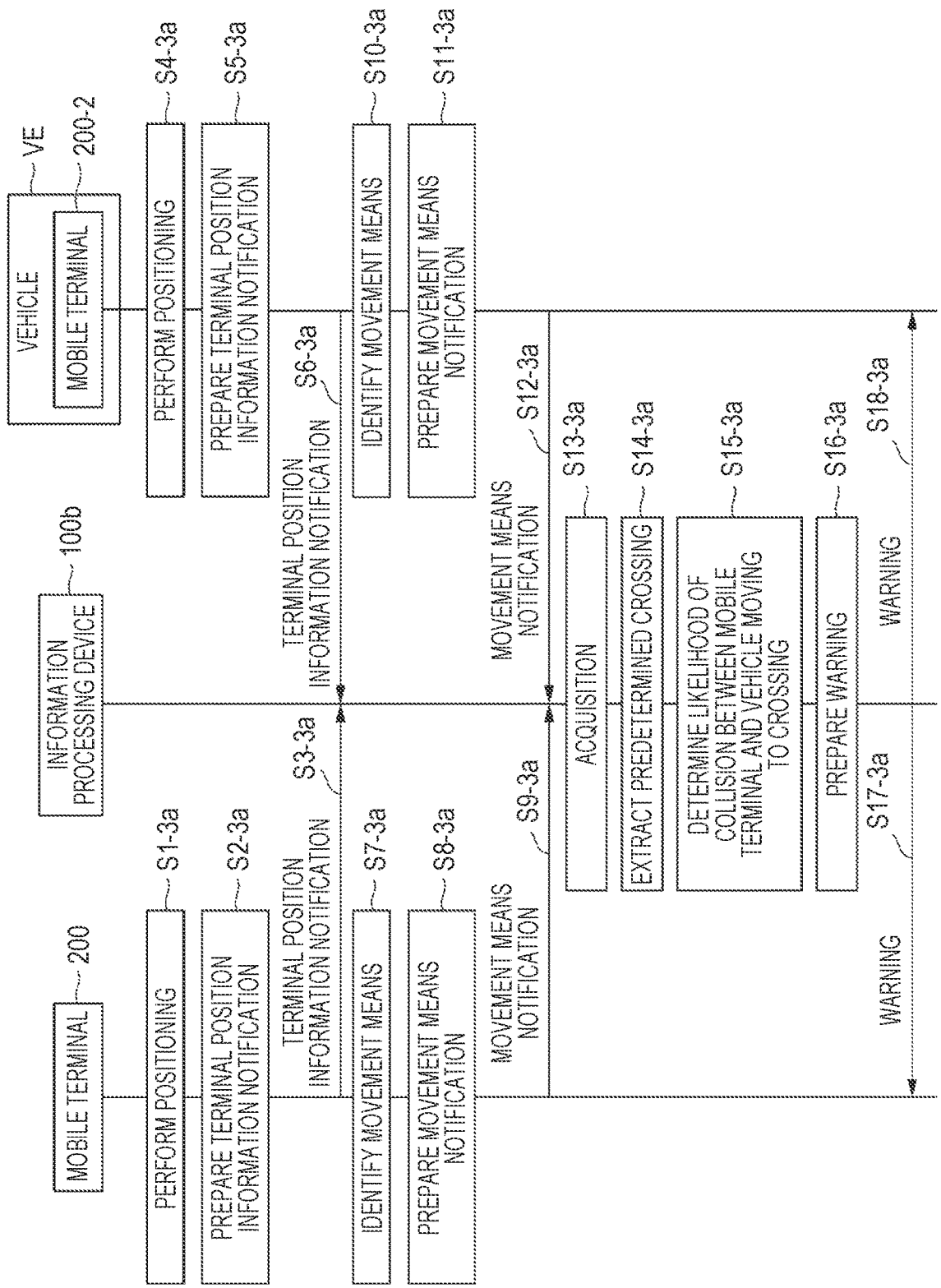

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2021-177954 filed on Oct. 29, 2021, incorporated herein by reference in its entirety.

BACKGROUND

1. Technical Field

The disclosure relates to an information processing device, an information processing method, and a storage medium.

2. Description of Related Art

A system that determines a likelihood of collision between a pedestrian and a vehicle at a crossing based on position information or the like acquired from a smartphone held by the pedestrian and position information or the like acquired from the vehicle and notifies the pedestrian or the vehicle when the likelihood of collision is high is known (for example, see Japanese Unexamined Patent Application Publication No. 2010-272125 (JP 2010-272125 A)).

SUMMARY

However, a user who is holding a mobile terminal such as a smartphone cannot necessarily be said to be walking. For example, when a user who is holding a smartphone is riding on a bicycle, the user arrives at a crossing earlier than when the user is walking and thus needs to be notified of the likelihood of collision earlier. The disclosure provides an information processing device, an information processing method, and a computer program that can give a warning based on a likelihood of collision according to a movement means of a holder of a mobile terminal.

(1) According to an aspect of the disclosure, there is provided an information processing device including: a first acquisition unit configured to acquire position information of a mobile terminal; a second acquisition unit configured to acquire position information of a vehicle; a third acquisition unit configured to acquire movement means information of a holder of the mobile terminal; a determination unit configured to determine a likelihood of collision between the holder of the mobile terminal and the vehicle at a crossing based on a position of at least one crossing included in road information stored in a storage unit, the position information of the mobile terminal acquired by the first acquisition unit, the position information of the vehicle acquired by the second acquisition unit, and the movement means information of the holder of the mobile terminal acquired by the third acquisition unit; and a notification unit configured to give a warning to at least one of the mobile terminal and a person in the vehicle based on a result of determination from the determination unit.

(2) In the information processing device according to the aspect of (1), the movement means information may be information indicating a movement means identified by the mobile terminal held by the holder.

(3) The information processing device according to the aspect of (1) or (2) may further include: a fourth acquisition unit configured to acquire sensor information from the mobile terminal; and a processing unit configured to identify a movement means of the holder of the mobile terminal based on the sensor information acquired by the fourth acquisition unit. The third acquisition unit may be configured to acquire the movement means information of the holder of the mobile terminal identified by the processing unit.

(4) In the information processing device according to the aspect of (3), the determination unit may be configured to determine whether the holder of the mobile terminal is walking or riding on a two-wheel vehicle using an AI based on the sensor information.

(5) In the information processing device according to any one of the aspects of (1) to (4), the notification unit may be configured to change a warning method depending on whether the holder of the mobile terminal is walking or riding on a two-wheel vehicle when the warning is given to a person in the vehicle.

(6) In the information processing device according to the aspect of (5), the notification unit may be configured to change a warning timing between when the holder of the mobile terminal is walking and when the holder of the mobile terminal is riding on a two-wheel vehicle.

(7) The information processing device according to any one of the aspects of (1) to (6) may further include an extraction unit configured to extract a predetermined crossing from the road information stored in the storage unit. The determination unit may be configured to determine the likelihood of collision between the holder of the mobile terminal and the vehicle at the predetermined crossing extracted by the extraction unit.

(8) In the information processing device according to the aspect of (7), the extraction unit may be configured to acquire crowd data and to extract a crossing at which the number of persons in a crowd is equal to or greater than a crowd threshold value based on the acquired crowd data, and the determination unit may be configured to determine the likelihood of collision between the holder of the mobile terminal and the vehicle at the crossing extracted by the extraction unit.

(9) In the information processing device according to the aspect of (7), the extraction unit may be configured to acquire accident occurrence data and to extract a crossing at which the number of accidents occurring in a predetermined period is equal to or greater than an accident number threshold value based on the acquired accident occurrence data, and the determination unit may be configured to determine the likelihood of collision between the holder of the mobile terminal and the vehicle at the crossing extracted by the extraction unit.

(10) In the information processing device according to the aspect of (7), the extraction unit may be configured to extract a crossing in an area in which a vehicle speed is limited to a predetermined speed or lower, and the determination unit may be configured to determine the likelihood of collision between the holder of the mobile terminal and the vehicle at the crossing in the area extracted by the extraction unit.

(11) According to another aspect of the disclosure, there is provided an information processing method that is performed by an information processing device, the information processing method including: acquiring position information of a mobile terminal; acquiring position information of a vehicle; acquiring movement means information of a holder of the mobile terminal; determining a likelihood of collision between the holder of the mobile terminal and the vehicle at a crossing based on a position of at least one crossing included in road information stored in a storage unit, the position information of the mobile terminal, the position information of the vehicle, and the movement means information of the holder of the mobile terminal; and giving a warning to at least one of the mobile terminal and a person in the vehicle based on a result of determination in the determining of a likelihood of collision.

(12) According to another aspect of the disclosure, there is provided a storage medium storing a computer program causing a computer to perform: acquiring position information of a mobile terminal; acquiring position information of a vehicle; acquiring movement means information of a holder of the mobile terminal; determining a likelihood of collision between the holder of the mobile terminal and the vehicle at a crossing based on a position of at least one crossing included in road information stored in a storage unit, the position information of the mobile terminal, the position information of the vehicle, and the movement means information of the holder of the mobile terminal; and giving a warning to at least one of the mobile terminal and a person in the vehicle based on a result of determination in the determining of a likelihood of collision.

According to the aspects of the disclosure, it is possible to provide an information processing device, an information processing method, and a storage medium that can give a warning based on a likelihood of collision according to a movement means of a holder of a mobile terminal.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a block diagram illustrating an example of an operation of the information processing device according to Modified Example 2 of the embodiment; and FIG. 12 is a diagram illustrating an example of an operation of an information processing system according to Modified Example 2 of the embodiment.

DETAILED DESCRIPTION OF EMBODIMENTS

Figure 1:
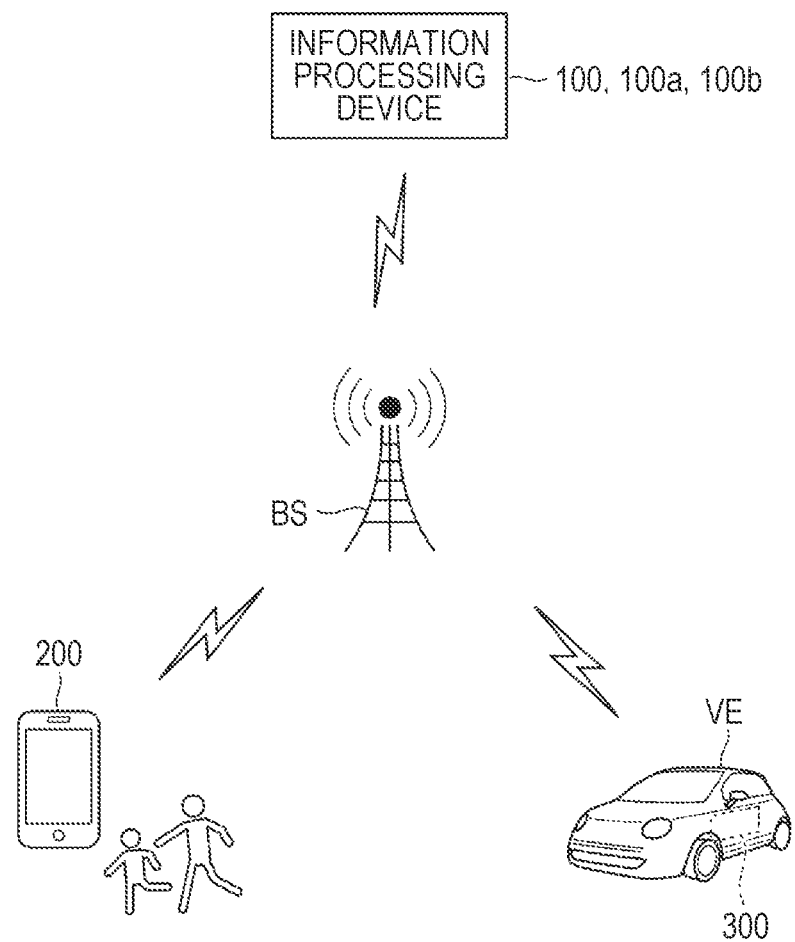
FIG. 1 is a diagram illustrating an example of a configuration of an information processing system according to an embodiment of the disclosure.

Hereinafter, an information processing device, an information processing method, and a computer program according to an embodiment will be described with reference to the accompanying drawings. The following embodiment is only an example and an embodiment of the disclosure is not limited to the following embodiment. In the drawings used for describing the embodiment, elements having the same functions will be referred to by the same reference signs and repeated description thereof will be omitted. "Based on XX" mentioned in this specification means "based on at least XX" and includes "based on another factor in addition to XX." "Based on XX" is not limited to "directly using XX" and includes "based on data obtained by performing calculation or processing using XX." "XX" is an arbitrary factor (for example, arbitrary information).

First Embodiment

Information Processing System

FIG. 1 is a diagram illustrating an example of a configuration of an information processing system according to an embodiment of the disclosure. In FIG. 1, an information processing system 1 includes an information processing device 100. In FIG. 1, a mobile terminal 200 and an onboard device 300 which is mounted in a vehicle VE are illustrated in the information processing device 100. The information processing device 100, the mobile terminal 200, and the onboard device 300 communicate with each other via a base station BS which is connected to a network NW. The network NW includes, for example, the Internet, a wide area network (WAN), a local area network (LAN), a provider device, and a radio base station.

The outline of processes in the information processing system 1 will be described below. The mobile terminal 200 performs positioning, prepares a terminal position information notification including a result of positioning (hereinafter referred to as "terminal position information") and identification information of the mobile terminal (hereinafter referred to as "terminal identification information"), and transmits the prepared terminal position information notification to the information processing device 100.

The mobile terminal 200 identifies a movement means of a holder of the mobile terminal 200 based on sensor information, prepares a movement means notification including information of the identified movement means of the holder of the mobile terminal 200 and the terminal identification information, and transmits the prepared movement means notification to the information processing device 100. The onboard device 300 performs positioning, prepares a vehicle position information notification including a result of positioning (hereinafter referred to as "vehicle position information") and identification information of the onboard device (hereinafter referred to as "onboard device identification information"), and transmits the prepared vehicle position information notification to the information processing device 100.

The information processing device 100 receives the terminal position information notification and the movement means notification transmitted by the mobile terminal 200 and receives the vehicle position information notification transmitted by the onboard device 300. The information processing device 100 acquires the terminal position information and the terminal identification information included in the received terminal position information notification, acquires the movement means information and the terminal identification information included in the received movement means notification, and acquires the vehicle position information and the onboard device identification information included in the vehicle position information notification.

The information processing device 100 determines a likelihood of collision between the holder of the mobile terminal 200 and the vehicle VE at a crossing based on a position of at least one crossing included in road information stored in the storage unit, the acquired terminal position information, the acquired vehicle position information, and the acquired movement means information of the holder of the mobile terminal 200. The information processing device 100 gives a warning to at least one of the mobile terminal 200 and a person in the vehicle VE such as a driver of the vehicle VE based on the result of determination of the likelihood of collision.

Figure 2:
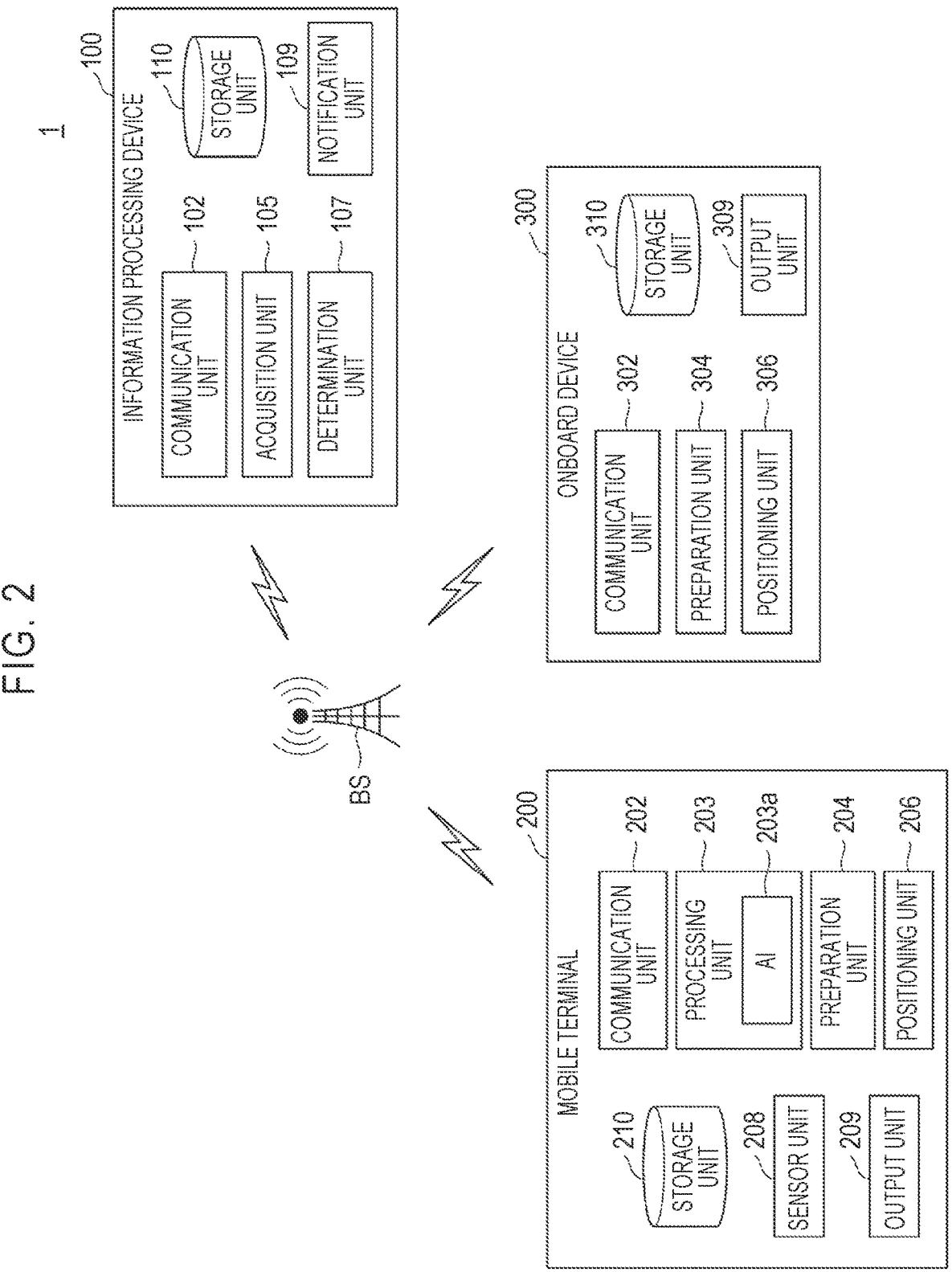
FIG. 2 is a diagram illustrating details of the information processing system according to the embodiment.

The information processing device 100, the mobile terminal 200, and the onboard device 300 included in the information processing system 1 will be sequentially described below. FIG. 2 is a diagram illustrating details of the information processing system according to this embodiment Information Processing Device 100

The information processing device 100 is realized by a device such as a personal computer, a server, a smartphone, a tablet computer, or an industrial computer. The information processing device 100 includes, for example, a communication unit 102, an acquisition unit 105, a determination unit 107, a notification unit 109, and a storage unit 110.

The communication unit 102 is realized by a communication module. The communication unit 102 communicates with an external communication device via a network NW. The communication unit 102 may perform communication through wireless communication such as wireless LAN, Bluetooth (registered trademark), or LTE (registered trademark). The communication unit 102 may perform communication through wired communication such as wired LAN. The communication unit 102 receives the terminal position information notification transmitted by the mobile terminal 200. The communication unit 102 receives the vehicle position information notification transmitted by the onboard device 300. The communication unit 102 receives the movement means notification transmitted by the mobile terminal 200. The communication unit 102 transmits a warning output from the notification unit 109.

The acquisition unit 105 acquires the terminal position information notification received by the communication unit 102, acquires the terminal position information and the terminal identification information included in the acquired terminal position information notification, and stores the terminal position information and the terminal identification information in correlation with an acquisition time in the storage unit 110. The acquisition unit 105 acquires the vehicle position information notification received by the communication unit 102, acquires the vehicle position information and the onboard device identification information included in the acquired vehicle position information notification, and stores the vehicle position information and the onboard device identification information in correlation with an acquisition time in the storage unit 110. The acquisition unit 105 acquires the movement means notification received by the communication unit 102, acquires the movement means information of the holder of the mobile terminal 200 and the terminal identification information included in the acquired movement means notification, and stores the movement means information and the terminal identification information in correlation with an acquisition time in the storage unit 110.

The storage unit 110 is realized by a hard disk drive (HDD), a flash memory, a random access memory (RAM), a read only memory (ROM), or the like. The storage unit 110 stores road information and a notification destination list. The road information includes information for identifying positions of one or more crossings and information indicating a degree of risk. The notification destination list includes terminal notification destination information in which the terminal identification information and a notification destination which is the mobile terminal corresponding to the terminal identification information are correlated and onboard device notification destination information in which the onboard device identification information and a notification destination which is the onboard device corresponding to the onboard device identification information are correlated. An example of the notification destination is subscriber identification information such as a phone number.

Figure 3:
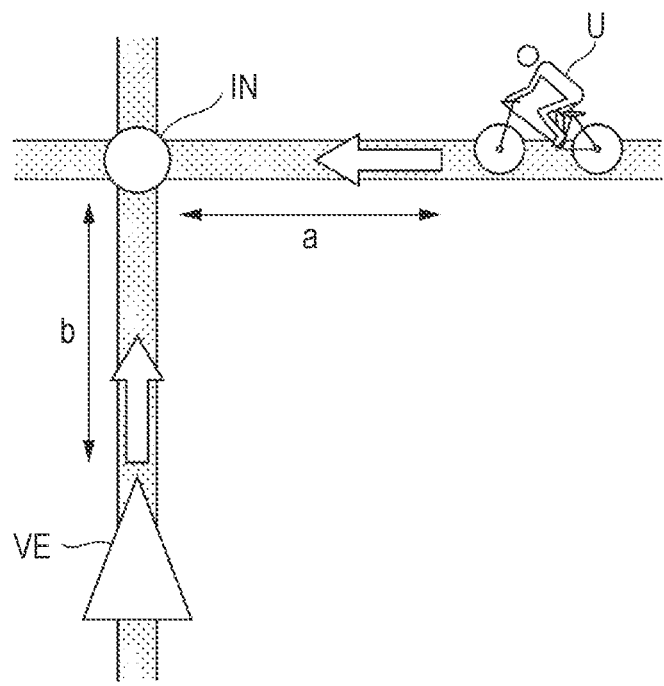
FIG. 3 is a diagram illustrating an example of a process of an information processing device according to the embodiment.

The determination unit 107 acquires the terminal position information, the vehicle position information, and the movement means information acquired by the acquisition unit 105 and the road information stored in the storage unit 110. The determination unit 107 determines a likelihood of collision between the holder of the mobile terminal 200 and the vehicle VE at the crossing included in the road information based on the terminal position information, the vehicle position information, the movement means information, and the road information. FIG. 3 is a diagram illustrating an example of processes in the information processing device according to this embodiment. FIG. 3 illustrates an example in which a bicycle is identified as the movement means. The same is true when walking is identified as the movement means.

The determination unit 107 calculates a distance a between the mobile terminal 200 and a crossing IN based on the position information of the crossing and the terminal position information. The determination unit 107 calculates a distance b between the vehicle VE and the crossing IN based on the position information of the crossing IN and the vehicle position information.

The determination unit 107 determines a likelihood of collision between the holder of the mobile terminal 200 and the vehicle VE based on the distance a between the mobile terminal 200 and the crossing IN and the distance b between the vehicle VE and the crossing IN. For example, the determination unit 107 determines that there is a likelihood of collision between the holder of the mobile terminal 200 and the vehicle VE when the distance a between the mobile terminal 200 and the crossing IN and the distance b between the vehicle VE and the crossing IN satisfy predetermined conditions.

Specifically, the determination unit 107 determines that there is a likelihood of collision between the holder of the mobile terminal 200 and the vehicle VE when the distance a between the mobile terminal 200 and the crossing IN is less than a terminal-crossing distance threshold value and the distance b between the vehicle VE and the crossing IN is less than a vehicle-crossing distance threshold value. An example of the terminal-crossing distance threshold value is 5 m, and an example of the vehicle-crossing distance threshold value is 20 m. The determination unit 107 determines that a warning is to be given when there is a likelihood of collision between the holder of the mobile terminal 200 and the vehicle VE. The terminal-crossing distance threshold value may be changed depending on a movement means of the holder of the mobile terminal 200. For example, the terminal-crossing distance threshold value is 2 m when the movement means of the holder of the mobile terminal 200 is walking and is 5 m when the movement means of the holder of the mobile terminal 200 is a bicycle. The determination unit 107 may change a determination criterion for determining whether a warning is to be given at a crossing with a high risk and a crossing other than a crossing with a high risk. Description will be continued with reference back to FIG. 2.

The notification unit 109 gives a warning to at least one of the mobile terminal 200 and a person in the vehicle VE such as a driver of the vehicle VE based on the determination result from the determination unit 107. For example, when a warning is given, the notification unit 109 identifies terminal identification information of the mobile terminal 200 having transmitted the terminal position information and onboard device identification information of the onboard device 300 having transmitted the onboard device position information.

The notification unit 109 acquires a notification destination stored in correlation with the acquired terminal identification information and a notification destination stored in correlation with the onboard device identification information from a notification destination list in the storage unit 110. The notification unit 109 gives a warning to at least one of the mobile terminal 200 and the onboard device 300 based on the acquired notification destinations. The notification unit 109 may change a warning method depending on whether the holder of the mobile terminal 200 is walking or riding on a two-wheel vehicle based on the acquired movement means information. Specifically, when the onboard device 300 is notified, the notification unit 109 notifies the onboard device 300 such that a person in the vehicle VE such as a driver of the vehicle VE can recognize whether the holder of the mobile terminal 200 is walking or riding on a two-wheel vehicle. For example, the notification unit 109 may change a warning sound depending on whether the holder of the mobile terminal 200 is walking or riding on a two-wheel vehicle.

The notification unit 109 may change a warning timing when the holder of the mobile terminal 200 is walking and when the holder of the mobile terminal 200 is riding on a two-wheel vehicle. Specifically, the determination unit 107 sets a first distance threshold value when the holder is riding on a two-wheel vehicle to be larger than the first distance threshold value when the holder is walking. The notification unit 109 may give a warning in a plurality of steps. Specifically, the determination unit 107 determines a distance a between the mobile terminal 200 and the crossing IN based on a plurality of terminal-crossing distance threshold values, and determines that a warning is to be given when the distance a between the mobile terminal 200 and the crossing IN satisfies the corresponding one out of the plurality of terminal-crossing distance threshold values.

The determination unit 107 determines a distance b between the vehicle VE and the crossing IN based on a plurality of vehicle-crossing distance threshold values, and determines that a warning is to be given when the distance b between the vehicle VE and the crossing IN satisfies the corresponding one out of the plurality of vehicle-crossing distance threshold values. For example, when the distance a between the mobile terminal 200 and the crossing IN is less than 10 m and the distance b between the vehicle VE and the crossing IN is less than 100 m, a first warning "notice a vehicle (pedestrian) approaching the crossing" is given. Thereafter, when the distance a between the mobile terminal 200 and the crossing IN is less than 2 m and the distance b between the vehicle VE and the crossing IN is less than 10 m, a next warning "Dangerous! Please, speed down" is given.

The notification unit 109 may change the warning timing depending on one or both of a road width and a vehicle speed. For example, the notification unit 109 sets a frequency in which a warning is given to be higher when the road width is small than that when the road width is large. For example, the notification unit 109 gives a warning earlier (at a longer distance from the crossing) when the road width is small than when the road width is large. For example, the notification unit 109 sets the frequency in which a warning is given to be higher when the vehicle speed is high than that when the vehicle speed is low. The notification unit 109 may change one or both of the warning timing and the warning details at a crossing with a high risk and a crossing other than the crossing with a high risk. Specifically, the notification unit 109 gives a warning at a crossing with a high risk at a longer distance from the crossing than at a crossing other than the crossing with a high risk.

The notification unit 109 adds information indicating that it is a crossing with a high risk to the warning at the crossing with a high risk. For example, the notification unit 109 gives a warning "notice a vehicle (pedestrian) approaching a crossing with a high risk." The notification unit 109 outputs the warning to the communication unit 102.

The acquisition unit 105, the determination unit 107, and the notification unit 109 are realized, for example, by causing a hardware processor such as a central processing unit (CPU) to execute a computer program (software) stored in the storage unit 110. Some or all of the functional units may be realized by hardware (a circuit unit including circuitry) such as a large scale integration (LSI), an application-specific integrated circuit (ASIC), a field-programmable gate array (FPGA), or a graphics processing unit (GPU) or may be realized by a combination of software and hardware.

Mobile Terminal 200

The mobile terminal 200 is realized by a device such as a personal computer, a smartphone, a tablet computer, or an industrial computer. The mobile terminal 200 includes, for example, a communication unit 202, a processing unit 203, a preparation unit 204, a positioning unit 206, a sensor unit 208, an output unit 209, and a storage unit 210. The communication unit 202 is realized by a communication module. The communication unit 202 communicates with an external communication device via a network NW.

The communication unit 202 may perform communication through wireless communication such as wireless LAN, Bluetooth (registered trademark), or LTE (registered trademark). The communication unit 202 transmits a terminal position information notification output from the preparation unit 204 to the information processing device 100. The communication unit 202 transmits a movement means notification output from the preparation unit 204 to the information processing device 100. The communication unit 202 receives a warning transmitted from the information processing device 100.

The sensor unit 208 includes a sensor that can measure a moving speed of the holder of the mobile terminal 200 such as a speed sensor, an acceleration sensor, or a gyro sensor. The sensor unit 208 acquires sensor information by sensing.

The processing unit 203 acquires the sensor information from the sensor unit 208. The processing unit 203 identifies a movement means of the holder of the mobile terminal 200 based on the acquired sensor information. Specifically, the processing unit 203 performs determination based on the sensor information of the mobile terminal 200.

The processing unit 203 includes an AI 203*a*. The AI 203*a* includes a result (trained model) obtained by performing machine learning of a relationship between the sensor information acquired by the mobile terminal 200 and the movement means of the holder of the mobile terminal 200. Here, the movement means of the holder of the mobile terminal 200 includes walking and riding on a two-wheel vehicle (a bicycle). The AI 203*a* identifies the movement means of the holder of the mobile terminal 200 based on the sensor information acquired by the processing unit 203. Description will be continued with reference back to FIG. 2.

The preparation unit 204 acquires movement means information of the holder of the mobile terminal 200 from the processing unit 203 and prepares a movement means notification including the acquired movement means information and terminal identification information and including the information processing device 100 as a destination. The preparation unit 204 outputs the prepared movement means notification to the communication unit 202.

The positioning unit 206 acquires position information of the mobile terminal 200 by receiving navigation signals wirelessly transmitted from a plurality of navigation satellites (not illustrated) and performing positioning of the mobile terminal 200 based on the navigation signals. The positioning unit 206 receives a downlink radio signal transmitted from a base station (not illustrated) and acquires position information accessory to the downlink radio signal. The positioning unit 206 has one or more sensors mounted thereon and acquires position information by performing positioning of the mobile terminal 200 based on information acquired by the one or more sensors.

The preparation unit 204 acquires terminal position information from the positioning unit 206 and prepares a terminal position information notification including the acquired terminal position information and terminal identification information and including the information processing device 100 as a destination. The preparation unit 204 outputs the prepared terminal position information notification to the communication unit 202.

The output unit 209 acquires a warning from the communication unit 202 and outputs the acquired warning. The output unit 209 may output the warning in sound or display the warning on a display unit (not illustrated).

The processing unit 203, the preparation unit 204, and the output unit 209 are realized, for example, by causing a hardware processor such as a CPU to execute a computer program (software) stored in the storage unit 210. Some or all of the functional units may be realized by hardware (a circuit unit including circuitry) such as an LSI, an ASIC, an FPGA, or a GPU or may be realized by a combination of software and hardware.

Onboard Device 300

The onboard device 300 is realized by a device such as a personal computer, a smartphone, a tablet computer, or an industrial computer. The onboard device 300 includes, for example, a communication unit 302, a preparation unit 304, a positioning unit 306, an output unit 309, and a storage unit 310. The communication unit 302 is realized by a communication module. The communication unit 302 communicates with an external communication device via a network NW. The communication unit 302 may perform communication through wireless communication such as wireless LAN, Bluetooth (registered trademark), or LTE (registered trademark). The communication unit 302 transmits a vehicle position information notification output from the preparation unit 304 to the information processing device 100. The communication unit 302 receives a warning transmitted from the information processing device 100.

The positioning unit 306 acquires position information of the vehicle VE by receiving navigation signals wirelessly transmitted from a plurality of navigation satellites (not illustrated) and performing positioning of the onboard device 300 based on the navigation signals. The positioning unit 306 receives a downlink radio signal transmitted from a base station (not illustrated) and acquires position information accessory to the downlink radio signal. The positioning unit 306 has one or more sensors mounted thereon and acquires position information of the vehicle VE by performing positioning of the onboard device 300 based on information acquired by the one or more sensors. The preparation unit 304 acquires vehicle position information from the positioning unit 306 and prepares a vehicle position information notification including the acquired vehicle position information and onboard device identification information and including the information processing device 100 as a destination. The preparation unit 304 outputs the prepared vehicle position information notification to the communication unit 302.

The output unit 309 acquires a warning from the communication unit 302 and outputs the acquired warning. The output unit 309 may output the warning in sound or display the warning on a display unit (not illustrated).

The preparation unit 304 and the output unit 309 are realized, for example, by causing a hardware processor such as a CPU to execute a computer program (software) stored in the storage unit 310. Some or all of the functional units may be realized by hardware (a circuit unit including circuitry) such as an LSI, an ASIC, an FPGA, or a GPU or may be realized by a combination of software and hardware.

Operations of Information Processing System 1

Figure 4:
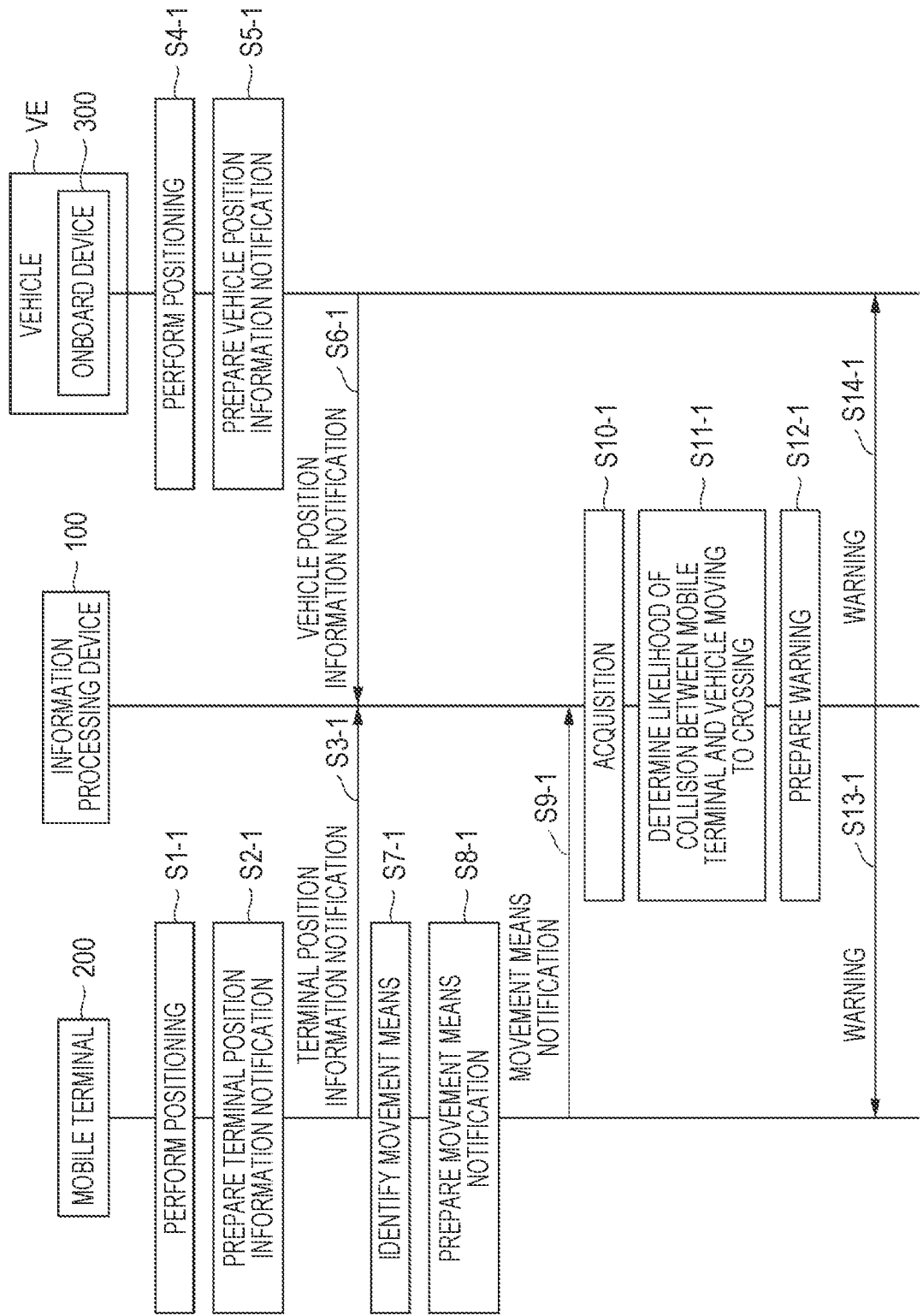
FIG. 4 is a diagram illustrating an example of an operation of the information processing system according to the embodiment.

FIG. 4 is a diagram illustrating an example of operations of the information processing system according to this embodiment.

(Step S1-1) In a mobile terminal 200, the positioning unit 206 acquires position information of the mobile terminal 200 by performing positioning.

(Step S2-1) In the mobile terminal 200, the preparation unit 204 acquires terminal position information from the positioning unit 206 and prepares a terminal position information notification including the acquired terminal position information and terminal identification information and including the information processing device 100 as a destination.

(Step S3-1) In the mobile terminal 200, the preparation unit 204 outputs the prepared terminal position information notification to the communication unit 202. The communication unit 202 transmits the terminal position information notification output from the preparation unit 204 to the information processing device 100. In the information processing device 100, the communication unit 102 receives the terminal position information notification transmitted by the mobile terminal 200.

(Step S4-1) In the onboard device 300, the positioning unit 306 acquires position information of the onboard device 300 by performing positioning.

(Step S5-1) In the onboard device 300, the preparation unit 304 acquires vehicle position information from the positioning unit 306 and prepares a vehicle position information notification including the acquired vehicle position information and onboard device identification information and including the information processing device 100 as a destination (Step S6-1) In the onboard device 300, the preparation unit 304 outputs the prepared vehicle position information notification to the communication unit 302. The communication unit 302 transmits the vehicle position information notification output from the preparation unit 304 to the information processing device 100. In the information processing device 100, the communication unit 102 receives the vehicle position information notification transmitted by the onboard device 300.

(Step S7-1) In the mobile terminal 200, the processing unit 203 acquires sensor information from the sensor unit 208. The processing unit 203 identifies a movement means of the holder of the mobile terminal 200 based on the acquired sensor information.

(Step S8-1) In the mobile terminal 200, the preparation unit 204 acquires movement means information of the holder of the mobile terminal 200 from the processing unit 203 and prepares a movement means notification including the acquired movement means information and terminal identification information and including the information processing device 100 as a destination.

(Step S9-1) In the mobile terminal 200, the preparation unit 204 outputs the prepared movement means notification to the communication unit 202. The communication unit 202 transmits the movement means notification output from the preparation unit 204 to the information processing device 100. In the information processing device 100, the communication unit 102 receives the movement means notification transmitted by the mobile terminal 200.

(Step S10-1) In the information processing device 100, the acquisition unit 105 acquires the terminal position information notification received by the communication unit 102 and acquires the terminal position information and the terminal identification information included in the acquired terminal position information notification. The acquisition unit 105 acquires the vehicle position information notification received by the communication unit 102 and acquires the vehicle position information and the onboard device identification information included in the acquired vehicle position information notification. The acquisition unit 105 acquires the movement means notification received by the communication unit 102 and acquires the movement means information of the holder of the mobile terminal 200 and the terminal identification information included in the acquired movement means notification.

(Step S11-1) In the information processing device 100, the determination unit 107 acquires the terminal position information, the vehicle position information, and the movement means information acquired by the acquisition unit 105 and road information stored in the storage unit 110. The determination unit 107 determines a likelihood of collision between the holder of the mobile terminal 200 and the vehicle VE at a crossing included in the road information based on the terminal position information, the vehicle position information, the movement means information, and the road information.

(Step S12-1) In the information processing device 100, the notification unit 109 gives a warning to at least one of the mobile terminal 200 and a person in the vehicle VE based on the determination result from the determination unit 107.

For example, it is assumed herein that the warning is given to both the mobile terminal 200 and the onboard device 300. The notification unit 109 acquires terminal identification information of the mobile terminal 200 having transmitted the terminal position information and onboard device identification information of the onboard device 300 having transmitted the onboard device position information. The notification unit 109 acquires a notification destination stored in correlation with the acquired terminal identification information and a notification destination stored in correlation with the onboard device identification information from a notification destination list in the storage unit 110. The notification unit 109 prepares a warning which is to be given to the mobile terminal 200 and the vehicle VE based on the acquired notification destinations.

(Step S13-1) In the information processing device 100, the notification unit 109 outputs the prepared warning to the communication unit 102. The communication unit 102 transmits the warning output from the notification unit 109 to the mobile terminal 200.

(Step S14-1) In the information processing device 100, the notification unit 109 outputs the prepared warning to the communication unit 102. The communication unit 102 transmits the warning output from the notification unit 109 to the onboard device 300. Thereafter, the routine returns to Step S1-1 and the same processes are performed with a predetermined cycle.

In the aforementioned embodiment, for example, road information is stored in the storage unit 110 of the information processing device 100, but the disclosure is not limited to this example. For example, road information may be stored in cloud. The information processing device 100 acquires the road information from the cloud.

In the aforementioned embodiment, for example, the information processing system 1 includes one mobile terminal 200, one onboard device 300, and one information processing device 100, but the disclosure is not limited to this example. For example, the information processing system 1 may include a plurality of mobile terminals 200, a plurality of onboard devices 300, and a plurality of information processing devices 100.

In the aforementioned embodiment, for example, the information processing device 100 acquires position information of a vehicle VE from the onboard device 300, but the disclosure is not limited to this example. For example, the information processing device 100 may handle terminal position information from a mobile terminal 200 held by a person in the vehicle VE such as a driver of the vehicle VE as the vehicle position information of the vehicle VE.

For example, it is assumed that a likelihood of collision between a holder of a mobile terminal 200-1 and a vehicle VE on which a holder of a mobile terminal 200-2 is riding at a crossing is determined. The mobile terminal 200-1 and the mobile terminal 200-2 have the same configuration as the mobile terminal 200. Here, they are different in the process of the processing unit 203 of the mobile terminal 200. The processing unit 203 acquires sensor information from the sensor unit 208. The processing unit 203 identifies a movement means of the holder of the mobile terminal 200-2 based on the acquired sensor information. Specifically, the processing unit 203 performs determination (primary determination) based on a moving speed of the holder of the mobile terminal 200 and determination (secondary determination) based on the sensor information.

In the primary determination, the processing unit 203 acquires the moving speed of the holder of the mobile terminal 200 based on the sensor information. The processing unit 203 determines whether the moving speed of the holder corresponds to movement using a vehicle VE or movement using a bicycle or walking based on the moving speed of the holder of the mobile terminal 200. The processing unit 203 determines that the holder of the mobile terminal 200 is moving using a vehicle VE when the moving speed of the holder is equal to or greater than a moving speed threshold value and determines that the holder of the mobile terminal 200 is moving using a bicycle or walking when the moving speed is less than the moving speed threshold value. An example of the moving speed threshold value is 30 km/h.

Figure 5:
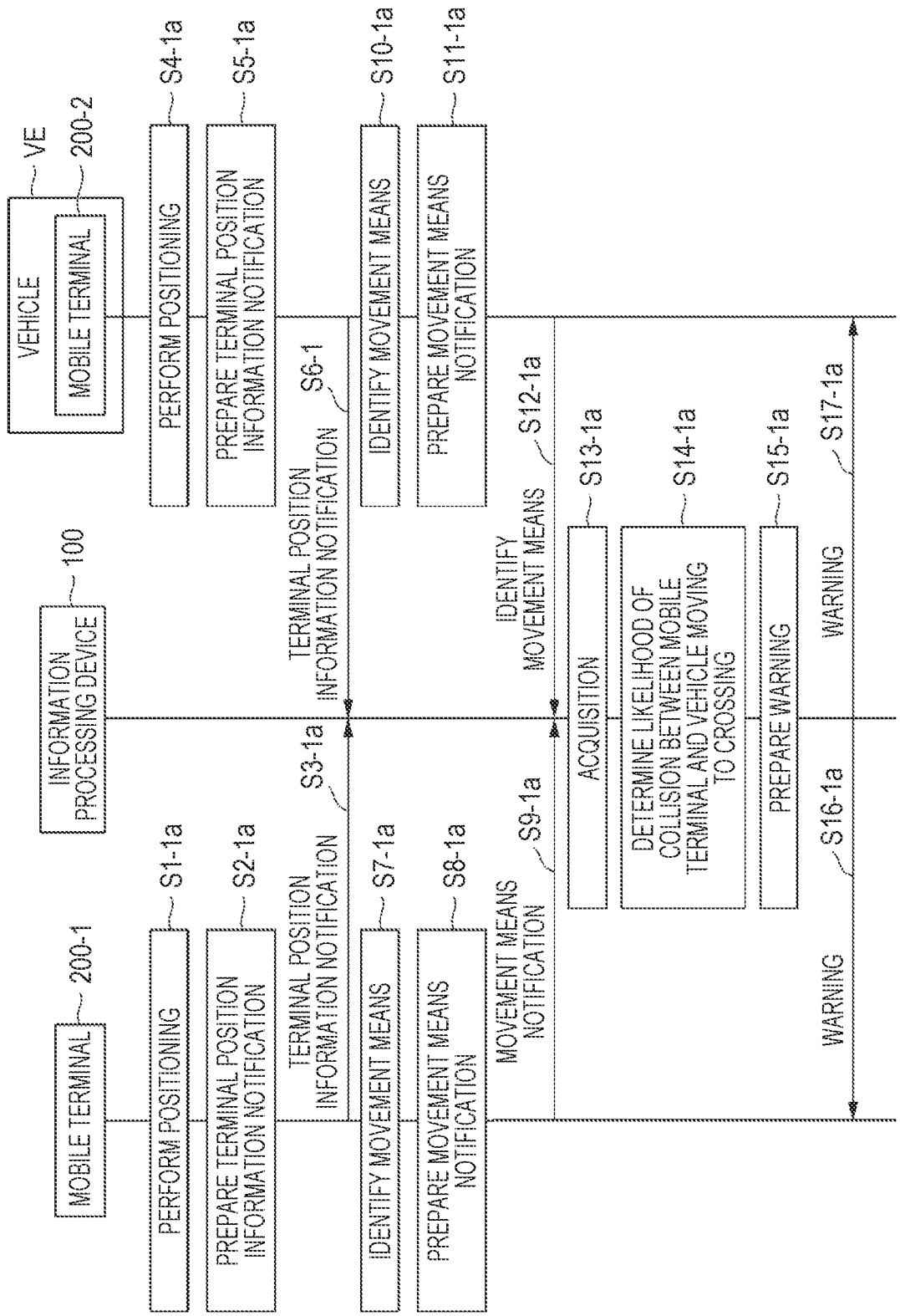
FIG. 5 is a diagram illustrating an example of an operation of the information processing system according to the embodiment.

FIG. 5 is a diagram illustrating an example of operations of the information processing system according to this embodiment. In FIG. 5, a likelihood of collision between a holder of a mobile terminal 200-1 and a vehicle VE on which a holder of a mobile terminal 200-2 is riding at a crossing is determined.

Steps S1-1a to S3-1a, Steps S8-1a to S9-1a, and Steps S15-1a to S17-1a are the same as Steps S1-1 to S3-1, Steps S8-1 to S9-1, and Steps S12-1 to S14-1 in FIG. 4, and thus description thereof will be omitted.

(Step S4-1a) In the mobile terminal 200-2, the positioning unit 206 acquires position information of the mobile terminal 200-2 by performing positioning.

(Step S5-1a) In the mobile terminal 200-2, the preparation unit 204 acquires terminal position information from the positioning unit 206 and prepares a terminal position information notification including the acquired terminal position information and terminal identification information and including the information processing device 100 as a destination (Step S6-1a) In the mobile terminal 200-2, the preparation unit 204 outputs the prepared terminal position information notification to the communication unit 202. The communication unit 202 transmits the terminal position information notification output from the preparation unit 204 to the information processing device 100. In the information processing device 100, the communication unit 102 receives the terminal position information notification transmitted by the mobile terminal 200-2.

(Step S10-1a) In the mobile terminal 200-2, the processing unit 203 acquires sensor information from the sensor unit 208. The processing unit 203 identifies a movement means of the holder of the mobile terminal 200-2 based on the acquired sensor information. The acquisition unit 105 acquires movement means information of the holder of the mobile terminal 200-2 identified by the processing unit 103.

(Step S11-1a) In the mobile terminal 200-2, the preparation unit 204 acquires the movement means information of the holder of the mobile terminal 200-2 from the acquisition unit 105 and prepares a movement means notification including the acquired movement means information and terminal identification information and including the information processing device 100 as a destination (Step S12-1a) In the mobile terminal 200-2, the preparation unit 204 outputs the prepared movement means notification to the communication unit 202. The communication unit 202 transmits the movement means notification output from the preparation unit 204 to the information processing device 100. In the information processing device 100, the communication unit 102 receives the movement means notification transmitted by the mobile terminal 200-2.

(Step S13-1a) In the information processing device 100, the acquisition unit 105 acquires the terminal position information notification received from the mobile terminal 200-1 by the communication unit 102 and acquires the terminal position information and the terminal identification information of the mobile terminal 200-1 included in the acquired terminal position information notification. The acquisition unit 105 acquires the terminal position information notification received from the mobile terminal 200-2 by the communication unit 102 and acquires the terminal position information and the terminal identification information of the mobile terminal 200-2 included in the acquired terminal position information notification. The acquisition unit 105 acquires the movement means notification received from the mobile terminal 200-1 by the communication unit 102 and acquires the movement means information and the terminal identification information of the holder of the mobile terminal 200-1 included in the acquired movement means notification. The acquisition unit 105 acquires the movement means notification received from the mobile terminal 200-2 by the communication unit 102 and acquires the movement means information and the terminal identification information of the holder of the mobile terminal 200-2 included in the acquired movement means notification.

(Step S14-1a) In the information processing device 100, the determination unit 107 acquires the terminal position information and the movement means information acquired from the mobile terminal 200-1 by the acquisition unit 105, the terminal position information and the movement means information from the mobile terminal 200-2, and the road information stored in the storage unit 110. The determination unit 107 determines whether the movement means is a vehicle VE based on the acquired movement means information from the mobile terminal 200-2. When it is determined that the movement means is a vehicle VE, the determination unit 107 handles terminal position information correlated with the terminal identification information corresponding to the movement means information as vehicle position information. Here, since the movement means information from the mobile terminal 200-2 indicates a vehicle VE, the determination unit 107 handles the terminal position information correlated with the terminal identification information of the mobile terminal 200-2 as the vehicle position information. The determination unit 107 determines a likelihood of collision between the holder of the mobile terminal 200 and the vehicle VE at a crossing included in the road information using the terminal position information from the mobile terminal 200-2 as the vehicle position information of the vehicle VE based on the terminal position information from the mobile terminal 200-1, the terminal position information and the movement means information from the mobile terminal 200-2, and the road information.

In the aforementioned embodiment, a trained model included in the AI 203a of the processing unit 203 may be updated.

In the aforementioned embodiment, the determination unit 107 of the information processing device 100 may predict behavior of the holder of the mobile terminal 200 based on the terminal position information and the movement means information.

Figure 6:
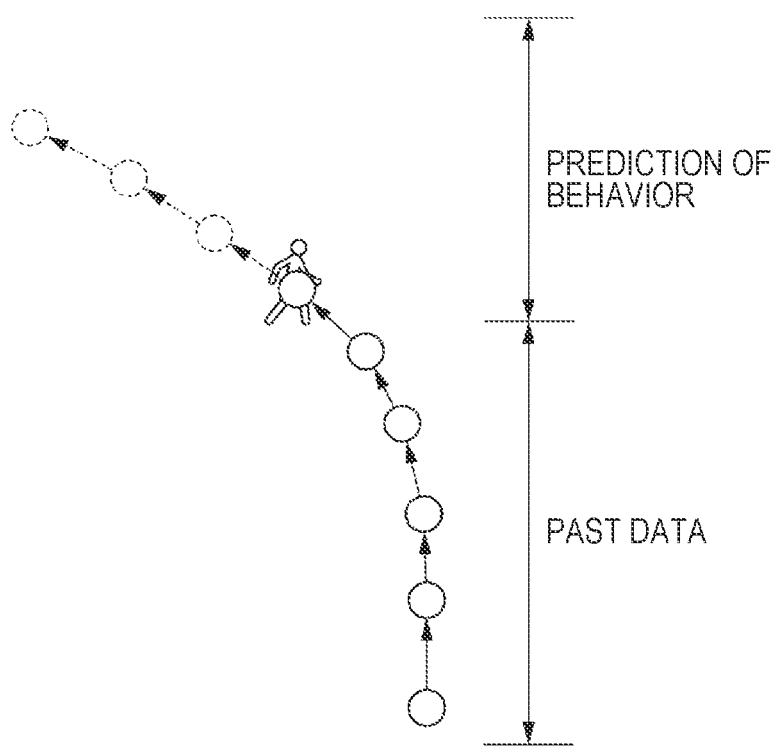
FIG. 6 is a diagram illustrating an example of an operation of the information processing device according to the embodiment.

FIG. 6 is a diagram illustrating an example of operations of the information processing device according to this embodiment. In FIG. 6, past data is denoted by solid circles and data acquired through behavior prediction is denoted by dotted circles. The determination unit 107 calculates an average of accelerations from time-series data of the terminal position information. The determination unit 107 calculates a moving speed (a scalar value) based on the currently acquired terminal position information, the previously acquired terminal position information, and an elapsed time from the previous time, and predicts a speed based on the calculated moving speed and the average of accelerations.

The determination unit 107 acquires an angular velocity from the mobile terminal 200 in a predetermined cycle and calculates an average of angular velocities from time-series data of the angular velocities. The determination unit 107 predicts a moving direction of the mobile terminal 200 from the average of the angular velocities. The determination unit 107 determines a likelihood of collision between the holder of the mobile terminal 200 and the vehicle VE at a crossing included in the road information additionally using the prediction result of the speed and the prediction result of the moving direction. For example, the determination unit 107 predicts behavior from behavior data in X seconds in the past and determines that there is a risk (collision) when the holder of the mobile terminal and the vehicle VE are simultaneously present in an area of the crossing (Z meters from the crossing) after Y seconds in the future.

In the information processing system 1 according to this embodiment, the information processing device 100 includes a first acquisition unit which is the acquisition unit 105 configured to acquire position information of a mobile terminal 200, a second acquisition unit which is the acquisition unit 105 configured to acquire position information of a vehicle VE, a third acquisition unit which is the acquisition unit 105 configured to acquire movement means information of a holder of the mobile terminal 200, the determination unit 107 configured to determine a likelihood of collision between the holder of the mobile terminal 200 and the vehicle VE at a crossing based on a position of at least one crossing included in road information stored in the storage unit 110, the position information of the mobile terminal 200 acquired by the first acquisition unit, the position information of the vehicle VE acquired by the second acquisition unit, and the movement means information of the holder of the mobile terminal 200 acquired by the third acquisition unit, and the notification unit 109 configured to give a warning to at least one of the mobile terminal 200 and a person in the vehicle VE based on a result of determination from the determination unit 107.

By employing this configuration, the information processing device 100 can give a warning to at least one of the mobile terminal 200 and a person in the vehicle VE based on the result of determination of the likelihood of collision between the holder of the mobile terminal 200 and the vehicle VE at the crossing. Accordingly, at a crossing with poor visibility at which the mobile terminal 200 and the onboard device 300 have difficulty directly communicating with each other and which is not easily detected by a sensor, or the like, it is possible to perform one or both of notifying the holder of the mobile terminal 200 that the vehicle VE is present and notifying a person in the vehicle VE that the holder of the mobile terminal 200 is present.

In the information processing device 100, the movement means information is information indicating the movement means which is identified by a mobile terminal held by a holder. By employing this configuration, the information processing device 100 can determine a likelihood of collision between the holder of the mobile terminal 200 and the vehicle VE at a crossing based on the information indicating the movement means identified by the mobile terminal held by the holder.

In the information processing device 100, the notification unit 109 changes a warning method depending on whether the holder of the mobile terminal 200 is walking or riding on a two-wheel vehicle when a warning is given to a person in the vehicle VE. The holder of the mobile terminal 200 is considered to arrive at the crossing earlier when the holder is riding on a two-wheel vehicle than when the holder is walking after the likelihood of collision has been determined. By employing this configuration, a warning method can be changed for the holder of the mobile terminal 200 whose the time arriving at the crossing after the likelihood of collision has been determined varies depending on whether the holder of the mobile terminal 200 is walking or riding on a two-wheel vehicle.

In the information processing device 100, the notification unit 109 changes a warning timing when the holder of the mobile terminal 200 is walking and when the holder is riding on a two-wheel vehicle. The holder of the mobile terminal 200 is considered to approach the crossing earlier when the holder is riding on a two-wheel vehicle than when the holder is walking after the likelihood of collision has been determined. By employing this configuration, a warning timing can be changed for the holder of the mobile terminal 200 whose a speed at which the holder is approaching the crossing after the likelihood of collision has been determined varies depending on whether the holder of the mobile terminal 200 is walking or riding on a two-wheel vehicle.

Modified Example 1 of Embodiment

An information processing system 1a according to Modified Example 1 of the embodiment employs the configuration illustrated in FIG. 1. The information processing system 1a is different from the information processing system 1 in that an information processing device 100a is provided instead of the information processing device 100. In the aforementioned embodiment, a movement means of a holder of a mobile terminal 200 is identified by the mobile terminal 200. In Modified Example 1 of the embodiment, a movement means of a holder of a mobile terminal 200 is identified by the information processing device 100a.

Figure 7:
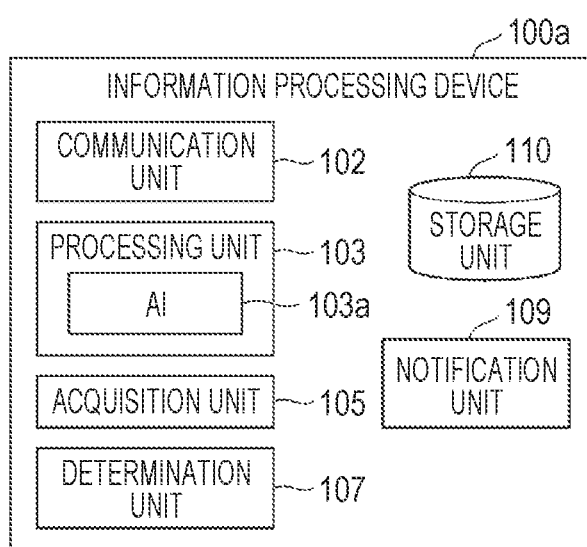
FIG. 7 is a block diagram illustrating an example of an information processing device according to Modified Example 1 of the embodiment.

FIG. 7 is a block diagram illustrating an example of the information processing device according to Modified Example 1 of the embodiment.

The information processing device 100a is realized by a device such as a personal computer, a server, a smartphone, a tablet computer, or an industrial computer. The information processing device 100a includes, for example, a communication unit 102, a processing unit 103, an acquisition unit 105, a determination unit 107, a notification unit 109, and a storage unit 110.

The communication unit 102 receives a terminal position information notification transmitted by the mobile terminal 200. The communication unit 102 receives a vehicle position information notification transmitted by the onboard device 300. The communication unit 102 receives a sensor information notification transmitted by the mobile terminal 200. The communication unit 102 transmits a warning output from the notification unit 109.

The acquisition unit 105 acquires the terminal position information notification received by the communication unit 102 and acquires the terminal position information and the terminal identification information included in the acquired terminal position information notification. The acquisition unit 105 acquires the vehicle position information notification received by the communication unit 102 and acquires the vehicle position information and the onboard device identification information included in the acquired vehicle position information notification. The acquisition unit 105 acquires the sensor information notification received by the communication unit 102 and acquires the sensor information and the terminal identification information included in the acquired sensor information notification.

The processing unit 103 acquires the sensor information from the acquisition unit 105. The processing unit 103 identifies a movement means of the holder of the mobile terminal 200 based on the acquired sensor information. Specifically, the processing unit 103 performs determination based on the sensor information of the mobile terminal 200.

The processing unit 103 includes an AI 103a. The AI 103a includes a result (trained model) obtained by performing machine learning of a relationship between the sensor information acquired by the mobile terminal 200 and the movement means of the holder of the mobile terminal 200. Here, the movement means of the holder of the mobile terminal 200 includes walking and riding on a two-wheel vehicle (a bicycle). The AI 103a identifies the movement means of the holder of the mobile terminal 200 based on the sensor information acquired by the processing unit 103. The acquisition unit 105 acquires the movement means information identified by the processing unit 103.

The determination unit 107 acquires the terminal position information, the vehicle position information, and the movement means information acquired by the acquisition unit 105 and road information stored in the storage unit 110. The determination unit 107 determines a likelihood of collision between the holder of the mobile terminal 200 and the vehicle VE at a crossing included in the road information based on the terminal position information, the vehicle position information, the movement means information, and the road information.

The processing unit 103 is realized, for example, by causing a hardware processor such as a CPU to execute a computer program (software) stored in the storage unit 110. Some or all of the functional units may be realized by hardware (a circuit unit including circuitry) such as an LSI, an ASIC, an FPGA, or a GPU or may be realized by a combination of software and hardware.

Operations of Information Processing System 1a

Figure 8:
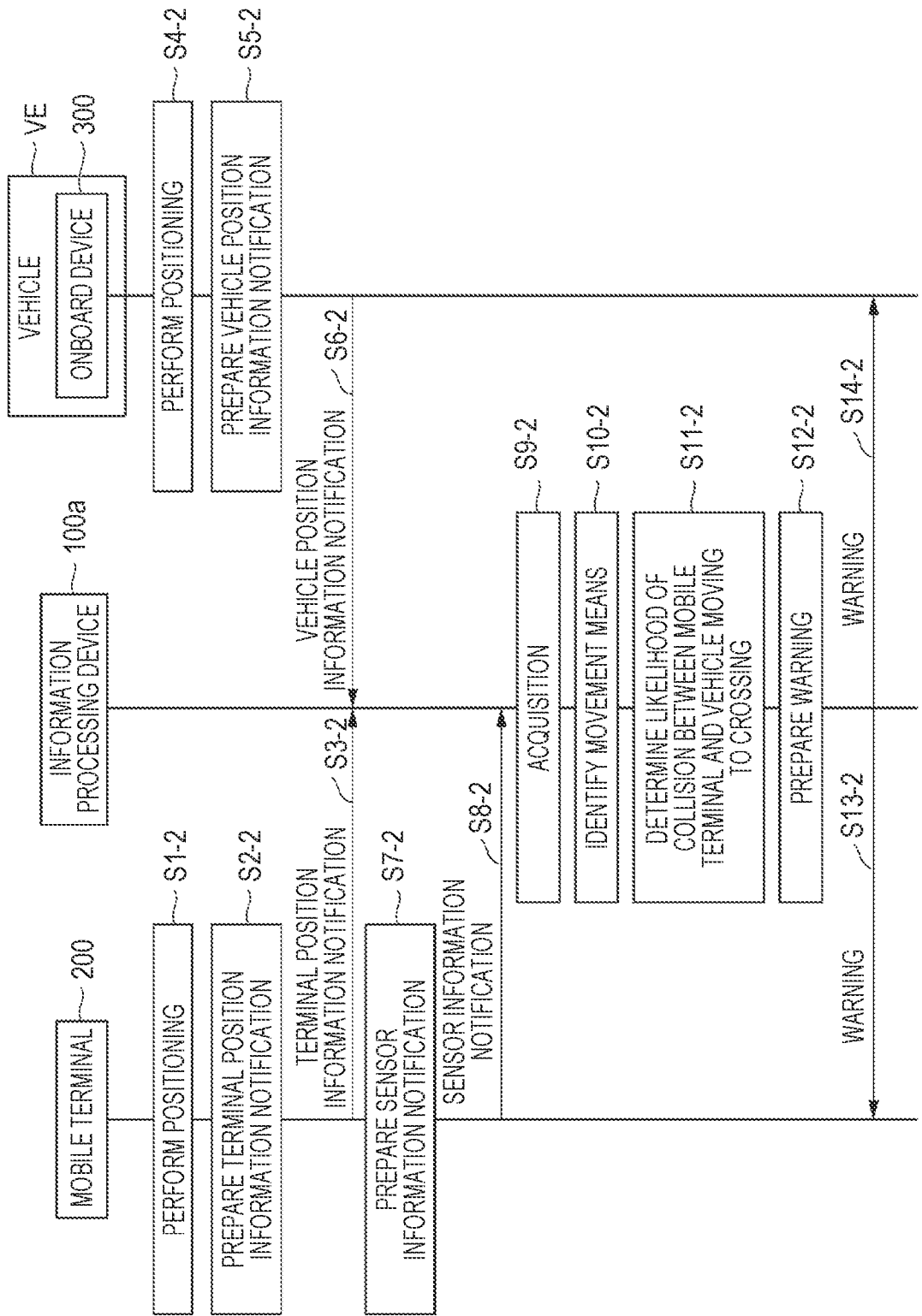
FIG. 8 is a diagram illustrating an example of an operation of an information processing system according to Modified Example 1 of the embodiment.

FIG. 8 is a diagram illustrating an example of operations of the information processing system according to Modified Example 1 of the embodiment. Steps S1-2 to S6-2 and Steps S12-2 to S14-2 are the same as Steps S1-1 to S6-1 and Steps S12-1 to S14-1 in FIG. 4, and thus description thereof will be omitted.

(Step S7-2) In the mobile terminal 200, the preparation unit 204 acquires sensor information from the sensor unit 208 and prepares a sensor information notification including the acquired sensor information and terminal identification information and including the information processing device 100 as a destination thereof.

(Step S8-2) In the mobile terminal 200, the preparation unit 204 outputs the prepared sensor information notification to the communication unit 202. The communication unit 202 transmits the sensor information notification output from the preparation unit 204 to the information processing device 100a. In the information processing device 100a, the communication unit 102 receives the sensor information notification transmitted by the mobile terminal 200.

(Step S9-2) In the information processing device 100a, the acquisition unit 105 acquires the terminal position information notification received by the communication unit 102, acquires the terminal position information and the terminal identification information included in the acquired terminal position information notification, and stores the terminal position information and the terminal identification information in correlation with an acquisition time in the storage unit 110. The acquisition unit 105 acquires the vehicle position information notification received by the communication unit 102, acquires the vehicle position information and the onboard device identification information included in the acquired vehicle position information notification, and stores the vehicle position information and the onboard device identification information in correlation with an acquisition time in the storage unit 110. The acquisition unit 105 acquires the sensor information notification received by the communication unit 102, acquires the sensor information and the terminal identification information included in the acquired sensor information notification, and stores the sensor information and the terminal identification information in correlation with an acquisition time in the storage unit 110.

(Step S10-2) In the information processing device 100a, the processing unit 103 acquires the sensor information from the acquisition unit 105. The processing unit 103 identifies a movement means of the holder of the mobile terminal 200 based on the acquired sensor information. The acquisition unit 105 acquires the movement means information identified by the processing unit 103.

(Step S11-2) In the information processing device 100a, the determination unit 107 acquires the terminal position information, the vehicle position information and the movement m means information acquired by the acquisition unit 105 and road information stored in the storage unit 110. The determination unit 107 determines a likelihood of collision between the holder of the mobile terminal 200 and the vehicle VE at a crossing included in the road information based on the terminal position information, the vehicle position information, the movement means information, and the road information.

In Modified Example 1 of the embodiment, an example in which the information processing device 100a acquires position information of the vehicle VE from the onboard device 300 has been described above, but the disclosure is not limited to the example. For example, the information processing device 100a may acquire sensor information from a mobile terminal 200 held by a person in the vehicle VE and acquire position information of the vehicle VE based on the acquired sensor information.

Figure 9:
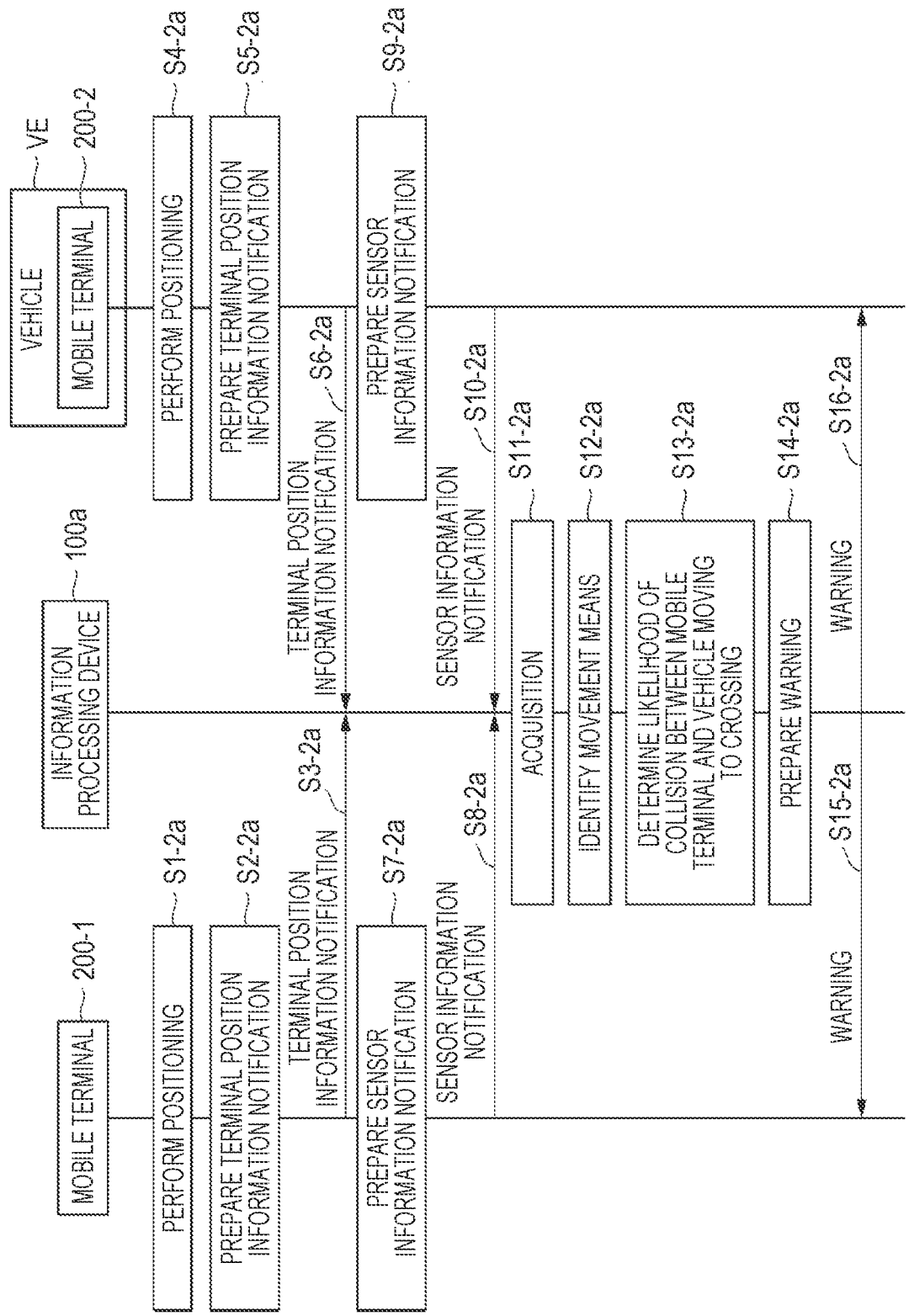
FIG. 9 is a diagram illustrating an example of an operation of the information processing system according to Modified Example 1 of the embodiment.

FIG. 9 is a diagram illustrating an example of operations of the information processing system according to Modified Example 1 of the embodiment. In FIG. 9, a likelihood of collision between a holder of a mobile terminal 200-1 and a vehicle VE on which a holder of a mobile terminal 200-2 is riding at a crossing is determined.

Steps S1-2a to S8-2a and Steps S14-2a to S16-2a are the same as Steps S1-1 to S3-1 in FIG. 4, Steps S4-1a to S6-1a in FIG. 5, Steps S7-2 to S8-2 in FIG. 8, and Steps S12-1 to S14-1 in FIG. 4, and thus description thereof will be omitted.

(Step S9-2a) In the mobile terminal 200-2, the preparation unit 204 acquires sensor information from the sensor unit 208 and prepares a sensor information notification including the acquired sensor information and terminal identification information and including the information processing device 100a as a destination thereof.

(Step S10-2a) In the mobile terminal 200-2, the preparation unit 204 outputs the prepared sensor information notification to the communication unit 202. The communication unit 202 transmits the sensor information notification output from the preparation unit 204 to the information processing device 100a. In the information processing device 100a, the communication unit 102 receives the sensor information notification transmitted by the mobile terminal 200-2.

(Step S11-2a) In the information processing device 100a, the acquisition unit 105 acquires the terminal position information notification received from the mobile terminal 200-1 by the communication unit 102, acquires the terminal position information and the terminal identification information included in the acquired terminal position information notification, and stores the terminal position information and the terminal identification information in correlation with an acquisition time in the storage unit 110. The acquisition unit 105 acquires the vehicle position information notification received from the mobile terminal 200-2 by the communication unit 102, acquires the vehicle position information and the onboard device identification information included in the acquired vehicle position information notification, and stores the vehicle position information and the onboard device identification information in correlation with an acquisition time in the storage unit 110. The acquisition unit 105 acquires the sensor information notification received from the mobile terminal 200-1 by the communication unit 102, acquires the sensor information and the terminal identification information included in the acquired sensor information notification, and stores the sensor information and the terminal identification information in correlation with an acquisition time in the storage unit 110. The acquisition unit 105 acquires a sensor information notification received from the mobile terminal 200-2 by the communication unit 102, acquires the sensor information and the terminal identification information included in the acquired sensor information notification, and stores the sensor information and the terminal identification information in correlation with an acquisition time in the storage unit 110.

(Step S12-2a) In the information processing device 100a, the processing unit 103 acquires the sensor information from the mobile terminal 200-1 from the acquisition unit 105. The processing unit 103 identifies the movement means of the holder of the mobile terminal 200-1 by performing determination using the moving speed of the holder of the mobile terminal 200-1 and determination using the sensor information based on the acquired sensor information. The processing unit 103 acquires the sensor information from the mobile terminal 200-2 from the acquisition unit 105. The processing unit 103 identifies the movement means of the holder of the mobile terminal 200-2 by performing determination using the moving speed of the holder of the mobile terminal 200-2 and determination using the sensor information based on the acquired sensor information. The acquisition unit 105 acquires the movement means information of the holder of the mobile terminal 200-1 and the movement means information of the holder of the mobile terminal 200-2 which are identified by the processing unit 103.

(Step S13-2a) In the information processing device 100a, the determination unit 107 acquires the terminal position information from the mobile terminal 200-1 and the terminal position information from the mobile terminal 200-2 which are acquired by the acquisition unit 105, the movement means information of the holder of the mobile terminal 200-1 and the movement means information of the holder of the mobile terminal 200-2 which are identified by the processing unit 103, and the road information stored in the storage unit 110. The determination unit 107 determines whether the movement means is a vehicle VE based on the movement means of the holder of the mobile terminal 200-1 identified by the processing unit 103. Here, since the movement means of the holder of the mobile terminal 200-1 is not a vehicle VE, it is assumed in the following description that the determination unit 107 handles the terminal position information correlated with the terminal identification information as terminal position information. The determination unit 107 determines whether the movement means is a vehicle VE based on the movement means of the holder of the mobile terminal 200-2 identified by the processing unit 103. Here, since the movement means of the holder of the mobile terminal 200-2 is a vehicle VE, it is assumed in the following description that the determination unit 107 handles the terminal position information correlated with the terminal identification information as vehicle position information.

The determination unit 107 determines a likelihood of collision between the holder of the mobile terminal 200 and the vehicle VE at a crossing included in the road information using the terminal position information from the mobile terminal 200-2 as the vehicle position information of the vehicle VE based on the terminal position information acquired from the mobile terminal 200-1, the terminal position information acquired from the mobile terminal 200-2, the movement means information, and the road information.

In the aforementioned embodiment, the trained model included in the AI 103a of the processing unit 103 may be updated.

With the information processing system la according to Modified Example 1 of the embodiment, the information processing device 100a further includes a fourth acquisition unit which is the acquisition unit 105 configured to acquire sensor information from a mobile terminal 200 and the processing unit 103 configured to acquire movement means information of a holder of the mobile terminal 200 based on the sensor information acquired by the fourth acquisition unit in addition to the configuration of the information processing device 100. The fourth acquisition unit acquires the movement means information of the holder of the mobile terminal 200 acquired by the processing unit 103.

By employing this configuration, the information processing device 100a can acquire the movement means information of the holder of the mobile terminal 200 based on the sensor information acquired from the mobile terminal 200. Accordingly, the information processing device 100a can determine a likelihood of collision between the holder of the mobile terminal 200 and the vehicle VE at a crossing based on the position information of the mobile terminal 200, the position information of the vehicle VE, and the movement means information of the holder of the mobile terminal 200.

In the information processing device 100a, the processing unit 103 determines whether the holder of the mobile terminal 200 is walking or riding on a two-wheel vehicle using the AI 103a based on the sensor information. By employing this configuration, the processing unit 103 can determine whether the holder of the mobile terminal 200 is walking or riding on a two-wheel vehicle by inputting the sensor information to the AI 103a including a trained model in which the sensor information is correlated with the movement means information of the holder of the mobile terminal 200 and acquiring the movement means information output from the AI 103a in response to the input sensor information.

Modified Example 2 of Embodiment

An information processing system 1b according to Modified Example 2 of the embodiment employs the configuration illustrated in FIG. 1. The information processing system 1b is different from the information processing system 1 in that an information processing device 100b is provided instead of the information processing device 100. In Modified Example 2 of the embodiment, the information processing device 100b determines a likelihood of collision between a holder of a mobile terminal 200 and a vehicle VE at a predetermined crossing based on a position of the predetermined crossing out of a plurality of crossings included in road information stored in a storage unit, terminal position information and vehicle position information which are acquired, and movement means information of the holder of the mobile terminal 200.

Figure 10:
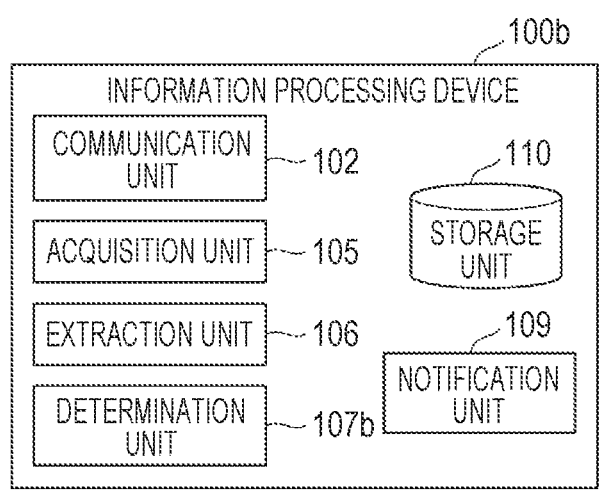
FIG. 10 is a block diagram illustrating an example of an information processing device according to Modified Example 2 of the embodiment.

FIG. 10 is a block diagram illustrating an example of an information processing device according to Modified Example 2 of the embodiment. The information processing device 100b is realized by a device such as a personal computer, a server, a smartphone, a tablet computer, or an industrial computer. The information processing device 100b includes, for example, a communication unit 102, an acquisition unit 105, an extraction unit 106, a determination unit 107b, a notification unit 109, and a storage unit 110.

The extraction unit 106 extracts a position of a predetermined crossing out of a plurality of crossings included in road information stored in the storage unit 110. Examples of the predetermined crossing include a crossing with a high risk, a crossing with poor visibility, and a crossing in an area in which a vehicle speed is limited to a predetermined speed or lower such as ZONE30.

Specifically, the extraction unit 106 extracts a crossing with poor visibility from road information stored in the storage unit 110. The extraction unit 106 acquires crowd data and extracts a crossing with a high risk from the road information stored in the storage unit 110 based on the acquired crowd data. Specifically, the extraction unit 106 extracts a crossing at which the number of persons in a crowd is larger than a person number threshold value, a crossing at which an occurrence probability of an accident is higher than an accident occurrence probability threshold value, or the like. The extraction unit 106 acquires accident occurrence data and extracts a crossing with a high risk from the road information stored in the storage unit 110 based on the acquired accident occurrence data. Specifically, the extraction unit 106 extracts a crossing at which the number of accidents occurring in a predetermined period is larger than an accident number threshold value, or the like. The extraction unit 106 extracts a crossing in an area in which a vehicle speed is limited to a predetermined speed or lower such as ZONE30 from the road information stored in the storage unit 110.

The determination unit 107b acquires the terminal position information, the vehicle position information, and the movement means information acquired by the acquisition unit 105 and the position of the predetermined crossing extracted by the extraction unit 106. The determination unit 107 determines a likelihood of collision between the holder of the mobile terminal 200 and the vehicle VE at the predetermined crossing based on the terminal position information, the vehicle position information, the movement means information, and the position of the predetermined crossing. A specific determination method is the same as in the aforementioned embodiment.

The notification unit 109 gives a warning to at least one of the mobile terminal 200 and a driver of the vehicle VE based on the determination result from the determination unit 107b. The notification unit 109 may give a warning in a plurality of steps. Examples of the plurality of steps include a step in which the likelihood of collision is low, a step in which the likelihood of collision is middle, and a step in which the likelihood of collision is high when the predetermined crossing is a crossing with a high risk.

The extraction unit 106 and the determination unit 107b are realized, for example, by causing a hardware processor such as a CPU to execute a computer program (software) stored in the storage unit 110. Some or all of the functional units may be realized by hardware (a circuit unit including circuitry) such as an LSI, an ASIC, an FPGA, or a GPU or may be realized by a combination of software and hardware.

Operations of Information Processing System 1b

FIG. 11 is a diagram illustrating an example of operations of the information processing system according to Modified Example 2 of the embodiment. Steps S1-3 to S10-3 and Steps S13-3 to S15-3 are the same as Steps S1-1 to S10-1 and Steps S12-1 to S14-1 in FIG. 4, and thus description thereof will be omitted.

(Step S11-3) In the information processing device 100b, the extraction unit 106 extracts a position of a predetermined crossing out of a plurality of crossings included in road information stored in the storage unit 110.

(Step S12-3) In the information processing device 100b, the determination unit 107b acquires the terminal position information, the vehicle position information, and the movement means information acquired by the acquisition unit 105 and position information of the predetermined crossing extracted by the extraction unit 106. The determination unit 107 determines a likelihood of collision between the holder of the mobile terminal 200 and the vehicle VE at the predetermined crossing based on the terminal position information, the vehicle position information, the movement means information, and the position of the predetermined crossing.

In Modified Example 2 of the embodiment, an example in which the information processing device 100b acquires position information of a vehicle VE from the onboard device 300 has been described above, but the disclosure is not limited to this example. For example, the information processing device 100b may handle terminal position information from a mobile terminal 200 held by a person in the vehicle VE as vehicle position information of the vehicle VE.

FIG. 12 is a diagram illustrating an example of operations of the information processing system according to Modified Example 2 of the embodiment. In FIG. 12, a likelihood of collision between a holder of a mobile terminal 200-1 and a vehicle VE on which a holder of a mobile terminal 200-2 is riding at a crossing is determined.

Steps S1-3a to S14-3a and Steps S16-3a to S18-3a are the same as Steps S1-1 to S3-1 in FIG. 4, Steps S4-1a to S6-1a in FIG. 5, Steps S7-1 to S9-1 in FIG. 4, Steps S10-1a to S13-1a in FIG. 5, Step S14-3 in FIG. 11, and Steps S12-1 to S14-1 in FIG. 4, and thus description thereof will be omitted.

(Step S15-3a) In the information processing device 100b, the determination unit 107b acquires the terminal position information and the movement means information from the mobile terminal 200-1 and the terminal position information and the movement means information from the mobile terminal 200-2 which are acquired by the acquisition unit 105 and position information of a predetermined crossing which is extracted by the extraction unit 106. The determination unit 107 determines whether the movement means is a vehicle VE based on the acquired movement means information from the mobile terminal 200-2. Here, since the movement means of the holder of the mobile terminal 200-2 is a vehicle VE, it is assumed in the following description that the determination unit 107 handles the terminal position information correlated with the terminal identification information as vehicle position information. The determination unit 107 determines a likelihood of collision between a holder of a mobile terminal 200 and a vehicle VE at a predetermined crossing using the terminal position information from the mobile terminal 200-2 as the vehicle position information of the vehicle VE based on the terminal position information from the mobile terminal 200-1, the terminal position information from the mobile terminal 200-2, the movement means information, and the position of the predetermined crossing.

In the information processing system 1b according to Modified Example 2 of the embodiment, the information processing device 100b further includes the extraction unit 106 configured to extract a predetermined crossing from the road information stored in the storage unit 110 in addition to the configuration of the information processing device 100. The determination unit 107b determines a likelihood of collision between a holder of a mobile terminal 200 and a vehicle VE at the predetermined crossing extracted by the extraction unit 106. By employing this configuration, since a likelihood of collision between a holder of a mobile terminal 200 and a vehicle VE at a predetermined crossing can be determined, it is possible to give a warning based on the likelihood of collision at the predetermined crossing.

In the information processing device 100b, the extraction unit 106 acquires crowd data and extracts a crossing at which the number of persons in a crowd is equal to or greater than a person number threshold value based on the acquired crowd data. The determination unit 107b determines a likelihood of collision between a holder of a mobile terminal 200 and a vehicle VE at the crossing extracted by the extraction unit 106. By employing this configuration, since a likelihood of collision between a holder of a mobile terminal 200 and a vehicle VE at a crossing with a high risk can be determined, it is possible to give a warning based on the likelihood of collision at the crossing with a high risk. Accordingly, in comparison with a case in which a warning is given based on likelihoods of collision at all crossings, it is possible to efficiently perform notification and to further reduce power consumption in the information processing device.

In the information processing device 100b, the extraction unit 106 acquires accident occurrence data and extracts a crossing at which the number of accidents occurring in a predetermined period is equal to or greater than an accident occurrence number threshold value based on the acquired accident occurrence data. The determination unit 107b determines a likelihood of collision between a holder of a mobile terminal 200 and a vehicle VE at a predetermined crossing at the crossing extracted by the extraction unit 106. By employing this configuration, since a likelihood of collision between a holder of a mobile terminal 200 and a vehicle VE at a predetermined crossing at a crossing with a high risk can be determined, it is possible to give a warning based on the likelihood of collision at the crossing with a high risk. Accordingly, in comparison with a case in which a warning is given based on likelihoods of collision at all crossings, it is possible to efficiently perform notification.

In the information processing device 100b, the extraction unit 106 extracts a crossing in an area in which a vehicle speed is limited to a predetermined speed or lower. The determination unit 107b determines a likelihood of collision between a holder of a mobile terminal 200 and a vehicle VE at the crossing in the area extracted by the extraction unit 106. By employing this configuration, since a likelihood of collision between a holder of a mobile terminal 200 and a vehicle VE at a crossing in an area in which a vehicle speed is limited to a predetermined speed or lower can be determined, it is possible to give a warning based on the likelihood of collision at the crossing in the area in which a vehicle speed is limited to a predetermined speed or lower. Accordingly, in comparison with a case in which a warning is given based on likelihoods of collision at all crossings, it is possible to efficiently perform notification and to further reduce power consumption in the information processing device.

With the information processing system according to the embodiment and the information processing systems according to Modified Example 1 and Modified Example 2 of the embodiment, since it is expected to improve traffic safety and to allow all persons to use a transportation system which is safe, easily usable, and sustainable at an appropriate cost, it is possible to contribute to Goal 11 "sustainable city planning" of Sustainable Development Goals (SDGs) led by United Nations.

While an embodiment of the disclosure has been described above in detail with reference to the accompanying drawings, a specific configuration of the disclosure is not limited to the embodiment and includes modifications in design without departing from the gist of the disclosure. For example, Modified Example 1 and Modified Example 2 of the embodiment may be combined. For example, an example in which the information processing device determines a likelihood of collision has been described above in the embodiment, but the likelihood of collision may be performed by a vehicle (onboard device) side. This configuration can be realized by transmitting a terminal position information notification or a movement means notification from a mobile terminal to a vehicle side via the information processing device or directly.

For example, the functions of the aforementioned devices may be realized by recording a computer program for realizing the functions of the devices on a computer-readable recording medium (storage medium) and causing a computer system to read and execute the computer program recorded on the recording medium. The "computer system" mentioned herein may include an operating system (OS) or hardware such as peripherals.

The "computer-readable recording medium" may be a flexible disk, a magneto-optical disc, a ROM, a writable nonvolatile memory such as a flash memory, a portable medium such as a digital versatile disc (DVD), or a storage device such as a hard disk incorporated in a computer system. The "computer-readable recording medium" may include a medium that holds a program for a predetermined time like a volatile memory (for example, a dynamic random access memory (DRAM)) in a computer system serving as a server or a client in a case in which a program is transmitted via a network such as the Internet or a communication circuit line such as a telephone line.

The program may be transmitted from a computer system in which the program is stored in a storage device or the like to another computer system via a transmission medium or by carrier waves in the transmission medium. Here, a "transmission medium for transmitting a program means media having a function of transmitting information like a network (communication network) such as the Internet or a communication circuit line (communication line) such as a telephone line.

The program may be a program for realizing some of the aforementioned functions. The program may be a so-called differential file (differential program) which can realize the aforementioned functions in combination with another program stored in advance in the computer system.

What is claimed is:

1. An information processing device comprising hardware, software, or a combination of hardware and software that causes the information processing device to:

acquire position information of a mobile terminal;
acquire position information of a vehicle;
acquire movement means information of a holder of the mobile terminal;
determine a likelihood of collision between the holder of the mobile terminal and the vehicle at a crossing based on a position of at least one crossing included in stored road information, the position information of the mobile terminal, the position information of the vehicle, and the movement means information of the holder of the mobile terminal;
give a warning to at least one of the mobile terminal and a person in the vehicle based on a result of determination;
change a warning method depending on whether the holder of the mobile terminal is walking or riding on a two-wheel vehicle when the warning is given to the person in the vehicle; and
change a warning timing between when the holder of the mobile terminal is walking and when the holder of the mobile terminal is riding on the two-wheel vehicle.

2. The information processing device according to claim 1, wherein the movement means information is information indicating a movement means identified by the mobile terminal held by the holder.

3. The information processing device according to claim 1, wherein the hardware, the software, or the combination of hardware and software further causes the information processing device to:
acquire sensor information from the mobile terminal;
identify a movement means of the holder of the mobile terminal based on the sensor information; and
acquire the movement means information of the holder of the mobile terminal.

4. The information processing device according to claim 3, wherein the hardware, the software, or the combination of hardware and software further causes the information processing device to determine whether the holder of the mobile terminal is walking or riding on the two-wheel vehicle using an artificial intelligence (AI) based on the sensor information.

5. The information processing device according to claim 1, wherein the hardware, the software, or the combination of hardware and software further causes the information processing device to:
extract a predetermined crossing from the stored road information; and
determine the likelihood of collision between the holder of the mobile terminal and the vehicle at the extracted predetermined crossing.

6. The information processing device according to claim 5, wherein the hardware, the software, or the combination of hardware and software further causes the information processing device to:
acquire crowd data and to extract a crossing at which a number of persons in a crowd is equal to or greater than a crowd threshold value based on the acquired crowd data; and
determine the likelihood of collision between the holder of the mobile terminal and the vehicle at the extracted crossing.

7. The information processing device according to claim 5, wherein the hardware, the software, or the combination of hardware and software further causes the information processing device to:
acquire accident occurrence data and to extract a crossing at which a number of accidents occurring in a predetermined period is equal to or greater than an accident number threshold value based on the acquired accident occurrence data; and
determine the likelihood of collision between the holder of the mobile terminal and the vehicle at the extracted crossing.

8. The information processing device according to claim 5, wherein the hardware, the software, or the combination of hardware and software further causes the information processing device to:
extract a crossing in an area in which a vehicle speed is limited to a predetermined speed; and
determine the likelihood of collision between the holder of the mobile terminal and the vehicle at the extracted crossing in the area.

9. An information processing method that is performed by an information processing device, the information processing method comprising:
acquiring position information of a mobile terminal;
acquiring position information of a vehicle;
acquiring movement means information of a holder of the mobile terminal;
determining a likelihood of collision between the holder of the mobile terminal and the vehicle at a crossing based on a position of at least one crossing included in stored road information, the position information of the mobile terminal, the position information of the vehicle, and the movement means information of the holder of the mobile terminal;
giving a warning to at least one of the mobile terminal and a person in the vehicle based on a result of determination in the determining of a likelihood of collision;
changing a warning method depending on whether the holder of the mobile terminal is walking or riding on a two-wheel vehicle when the warning is given to the person in the vehicle; and
changing a warning timing between when the holder of the mobile terminal is walking and when the holder of the mobile terminal is riding on the two-wheel vehicle.

10. A non-transitory storage medium storing a computer program causing a computer to perform:
acquiring position information of a mobile terminal;
acquiring position information of a vehicle;
acquiring movement means information of a holder of the mobile terminal;
determining a likelihood of collision between the holder of the mobile terminal and the vehicle at a crossing based on a position of at least one crossing included in stored road information, the position information of the mobile terminal, the position information of the vehicle, and the movement means information of the holder of the mobile terminal;
giving a warning to at least one of the mobile terminal and a person in the vehicle based on a result of determination in the determining of a likelihood of collision;
changing a warning method depending on whether the holder of the mobile terminal is walking or riding on a two-wheel vehicle when the warning is given to the person in the vehicle; and
changing a warning timing between when the holder of the mobile terminal is walking and when the holder of the mobile terminal is riding on the two-wheel vehicle.

* * * * *